No. 658,025. Patented Sept. 18, 1900.
H. B. SMITH.
MACHINE FOR CUTTING AND SCORING PAPER BOARD.
(Application filed May 10, 1900.)

(No Model.)

Witnesses
Robert Everett,
Theo. E. Sullivan

Inventor
Harry B. Smith,
By J. Granville Meyers,
Atty.

UNITED STATES PATENT OFFICE.

HARRY B. SMITH, OF NEW YORK, N. Y.

MACHINE FOR CUTTING AND SCORING PAPER-BOARD.

SPECIFICATION forming part of Letters Patent No. 658,025, dated September 18, 1900.

Application filed May 10, 1900. Serial No. 16,148. (No model.)

*To all whom it may concern:*

Be it known that I, HARRY B. SMITH, a citizen of the United States, residing at New York, (Brooklyn,) Kings county, New York, have invented certain new and useful Improvements in Machines for Scoring and Cutting Paper-Board, of which the following is a specification.

This invention relates to machines for scoring and trimming paper-box blanks and is in the nature of an improvement on the machine for which I filed an application for Letters Patent on the 12th day of December, 1899, Serial No. 740,056. In said application for patent I show and describe a rotary shaft or drum having adjustably mounted thereon a plurality of plain-faced and circumferentially-grooved rings, and over said shaft are arranged a plurality of cutting and scoring disks, the cutting-disks rotating in contact with the plain-faced rings and the scoring-disks rotating in contact with the grooved rings. In the said application I also show and describe means for holding the rings in their adjusted positions on the shaft or drum at any desired distance apart, consisting of open or divided spacing-rings which are adapted to be mounted on the shaft or drum between the rings, the cutting and scoring rings and the spacing-rings being collectively clamped together by pressure applied to the end rings.

The present invention has for its object to provide improved means for adjusting the cutting and scoring rings toward and from one another on the shaft or drum and for firmly holding them in their adjusted positions and to so construct the adjusting means that the cutting and scoring rings may be adjusted into close juxtaposition to or in contact with one another.

To these ends my invention consists in the features and in the construction, combination, and arrangement of parts hereinafter described, and particularly pointed out in the claims following the description, reference being had to the accompanying drawings, forming a part of this specification, wherein—

Figure 1:
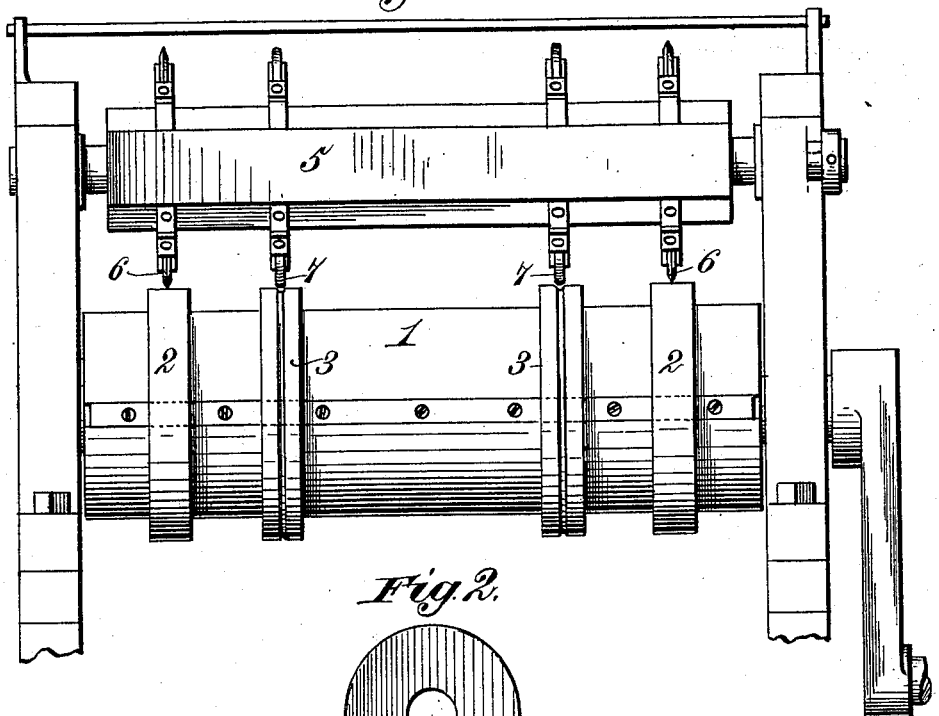
Figure 2:
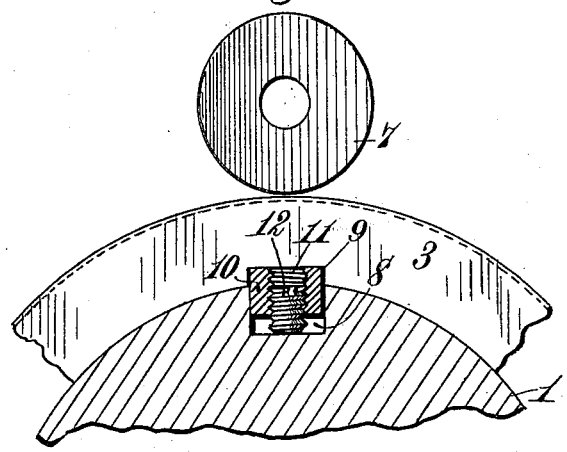
Figure 3:
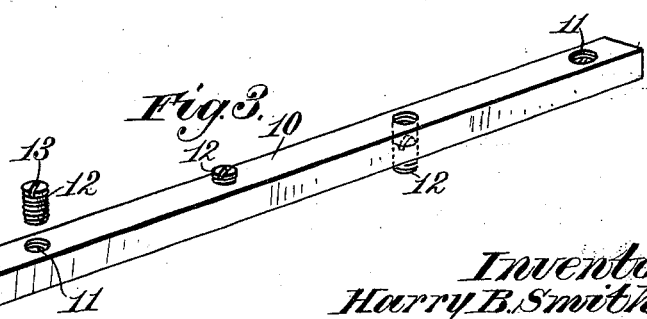

Figure 1 is a view in end elevation of a paper trimming and scoring machine, showing the cutting and scoring rings adjustably secured on the shaft or drum by the improved means forming the subject-matter of this application. Fig. 2 is a transverse sectional view, and Fig. 3 is a detail perspective view, of the locking strip or key.

Referring to Fig. 1 of the drawings, the numeral 1 indicates the rotatable shaft or drum, 2 the cutting and 3 the scoring rings mounted thereon, the cutting-rings 2 being provided with plain or true cylindrical faces, as shown, and the scoring-rings 3 being each provided with a circumferential groove 4.

Mounted in suitable frames adjustably fixed on a shaft 5 are cutting-disks 6 and scoring disks or rolls 7, the cutting-disks being arranged to contact with the cylindrical faces of the rings 2 and the scoring-rolls rotating in the circumferential grooves 4, formed in the peripheries of the rings 3. The edges of the cutting-disks are beveled or sharpened, as shown, while the edges of the scoring-rolls are rounded to correspond to the cross-sectional shape of the grooves 4, in which they rotate. Constructed as above described the shaft or drum 1 is rotated by any suitable means, while the disks 6 and rolls 7 are free to rotate in their frames, which latter are held adjustably fixed by any suitable means.

As shown in Fig. 1, the shaft 5 is provided with two oppositely-arranged groups or series of cutting and scoring disks and rolls, either of which may be brought into operative relation with the cutting and scoring rolls, and the frames carrying the said disks and rolls may also be adjusted longitudinally on the shaft 5 by means forming no part of the present invention and not shown.

In operation the strip of paper or cardboard from which the box is to be made is passed between the rings and disks and is carried between them by the rotation of the shaft 1, the disks 6 and rolls 7 freely rotating in unison with the positively-rotated rings 2 and 3. As the paper or cardboard passes between the disks and rolls and the rings the cutting-disks 6 rotating in contact with the rings 2 accurately trim off the edges of the strip or blank, while at the same time the scoring-rolls 7 force the stock into the grooves 4 of the rings 3 and form grooves on the upper side of the blank and corresponding ribs or beads on the opposite side thereof. The sides of the blank are designed to be bent up at right angles to the scored or grooved and beaded lines to form the sides and ends of the box.

The machine constructed and operating as above described is fully shown and described in my application for patent before referred to, and I will now describe the improved means for adjustably securing the rings 2 and 3 on the shaft 1, which forms the subject-matter of the present invention.

Formed in the periphery of the shaft or drum 1 is a longitudinal groove or keyway 8, preferably rectangular in cross-section, and formed in the interior of the rings 2 and 3 are corresponding grooves or keyways 9, adapted to register with the groove or keyway 8. Arranged in the groove 8 is a strip or key 10, preferably rectangular in cross-section to correspond to the cross-sectional shape of the groove 8 and preferably of such height or thickness that when the lower side of the strip or key rests on the bottom of the groove 8 its upper side will be flush with or below the perimeter of the shaft or drum. Formed transversely in the strip or key at suitable distances apart and passing entirely through the strip or key is a plurality of interiorly-threaded screw-holes or perforations 11, in each of which is screwed a machine-screw 12, provided at its outer end with a slot or nick 13, adapted to be engaged by an ordinary screw-driver.

The rings 2 and 3 having been arranged on the shaft or drum 1 at the desired distances apart and in such manner that their grooves or keyways 9 register with the groove or keyway 8 in the shaft or drum, the screws 12 are screwed inward in their screw-holes in the strip or key, and as their ends impinge against the bottom of the groove 8 the strip or key will be raised or forced partially out of the groove 8 and into the groove 9 in the rings 2 and 3, and as the screws are screwed home, or as far as it is possible to screw them, the strip or key will be forcibly thrust against the bottoms of the grooves 9 in the rings and will bind thereagainst with considerable frictional pressure, whereby the rings will be firmly and securely held against turning on the shaft and against longitudinal movement thereon. By providing a number of screws in each strip or key some of them will always be exposed in position to be engaged by the screw-driver, no matter what positions the rings may be adjusted to, and the number of such may also be increased or diminished, as desired.

It will be manifest that instead of making the strip or key in one single integral piece extending from end to end of the groove 8, as shown, said strip may be made in two or any desired number of sections, each section of which is independently adjustable, whereby one or more of the rings may be adjusted without disturbing the adjustment of the others, and it will also be obvious that the strip or key and the grooves or keyways may also be of other shape in cross-section than rectangular.

In the arrangement shown and described in my said former application for patent the rings could not be adjusted closer together than the thinnest spacing-ring would permit, and in certain other well-known machines the rings are provided with hubs through which are screwed set-screws that impinge against the shaft or drum, and in such arrangement the hubs prevent the rings from being adjusted closely together or in contact with one another. By the improved means herein shown and described, however, the rings may be adjusted as closely together as may be desired or even in contact with one another, whereby the blank may be scored and trimmed at any points or along any lines that occasion may require.

I have shown and described my invention as applied specifically to a box-blank scoring and trimming machine; but it will be readily understood that it may be successfully employed in other machines or mechanical structures wherein it is desirable to adjustably secure an annulus or a series or plurality of annuli on a shaft or drum, and I wish it to be understood that I regard such as being within the scope of my invention.

In the drawings I have shown but a single set or group of grooves in the shaft or drum and the rings, and but a single strip or key disposed therein; but it will be evident that two or more such sets or groups of grooves may be provided and that each such set or group may be provided with a single integral strip or key or a strip or key made in two or more sections, as before described.

Having described my invention, what I claim is—

1. The combination with a longitudinally-grooved shaft or drum and an annulus adjustably arranged thereon and provided with an internal groove adapted to register with the groove in the shaft or drum, of a strip or key normally disposed wholly within said groove in the shaft or drum, and means for forcibly thrusting said strip or key radially outward into the groove in the annulus and into frictional contact with the body of the latter, substantially as described.

2. The combination with a longitudinally-grooved shaft or drum and an annulus adjustably arranged thereon and provided with an internal groove adapted to register with the groove in the shaft or drum, of a strip or key normally disposed wholly within said groove in the shaft or drum, and means carried by said strip or key for forcing the latter radially outward into the groove in the annulus and into frictional contact with the body of the latter, substantially as described.

3. The combination with a longitudinally-grooved shaft or drum and an annulus adjustably arranged thereon and provided with an internal groove adapted to register with the groove in the shaft or drum, of a strip or key normally disposed wholly within said groove in the drum or shaft and provided with a plurality of threaded perforations or screw-holes passing transversely therethrough, and screws arranged in said perforations or screw-holes and arranged to impinge against the bottom of the groove in the shaft or drum and operating to force the strip or key radially outward into the groove in the annulus and into frictional contact with the body of the annulus, substantially as described.

4. In a machine for scoring and trimming paper-box blanks, the combination with a longitudinally-grooved shaft or drum, of cutting and scoring rings adjustably arranged thereon and each provided with an internal groove adapted to register with the groove in the shaft or drum, a strip or key disposed in the groove in said drum and provided with a plurality of threaded perforations or screw-holes passing transversely therethrough, and screws fitted in said perforations and arranged to impinge against the bottom of the groove in the drum or shaft and operating when turned in the proper direction to force the strip or key radially outward against the bottoms of the grooves in the said rings, substantially as described.

In testimony whereof I have hereunto set my hand in presence of two subscribing witnesses.

HARRY B. SMITH.

Witnesses:
KENNETH A. SOUTHWORTH,
PERCY J. EGBERT.